W. H. JONES.
RAKE.
APPLICATION FILED MAY 23, 1908.

933,990.

Patented Sept. 14, 1909.
2 SHEETS—SHEET 1.

WITNESSES:

INVENTOR
W. H. Jones.
BY
Attorneys

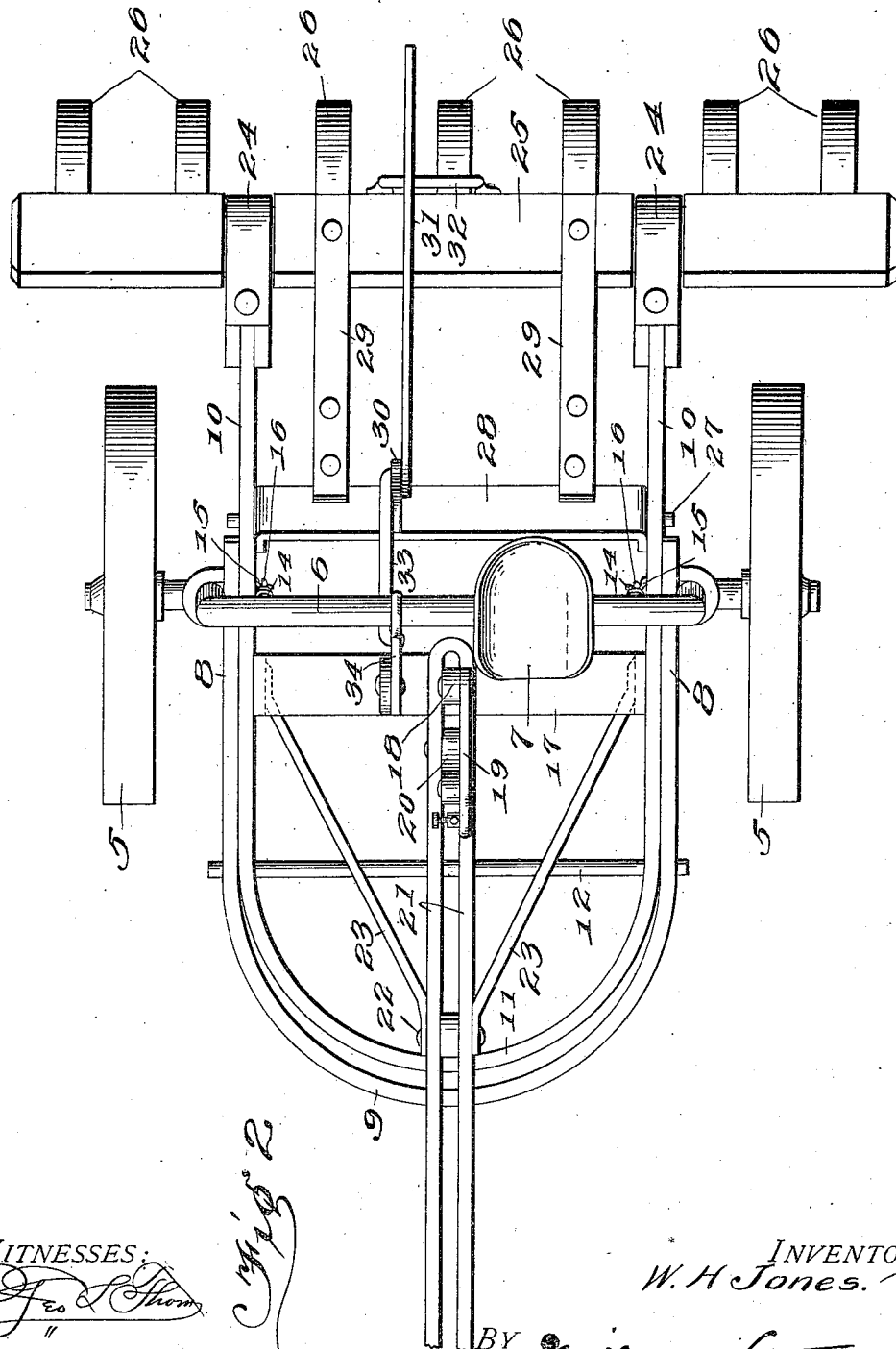

UNITED STATES PATENT OFFICE.

WILLIAM HENRY JONES, OF SAN GABRIEL, TEXAS.

RAKE.

933,990.

Specification of Letters Patent.  Patented Sept. 14, 1909.

Application filed May 23, 1908. Serial No. 434,685.

*To all whom it may concern:*

Be it known that I, WILLIAM H. JONES, a citizen of the United States, residing at San Gabriel, in the county of Milam and State of Texas, have invented certain new and useful Improvements in Rakes, of which the following is a specification.

This invention relates to rakes designed more particularly for cleaning up a field for plowing by gathering stalks and trash, although they can also be used for raking hay.

The object of the invention is to provide a rake of this kind which is strong and durable, and adapted for hard and rough work.

A further object of the invention is to provide improved means for dumping the rake, and also improved supporting means for the rake which permits it to travel over rough ground without digging thereinto.

With these and other objects in view as will appear more fully hereinafter, the invention consists in a novel combination and arrangement of parts described and claimed.

Figure 1:
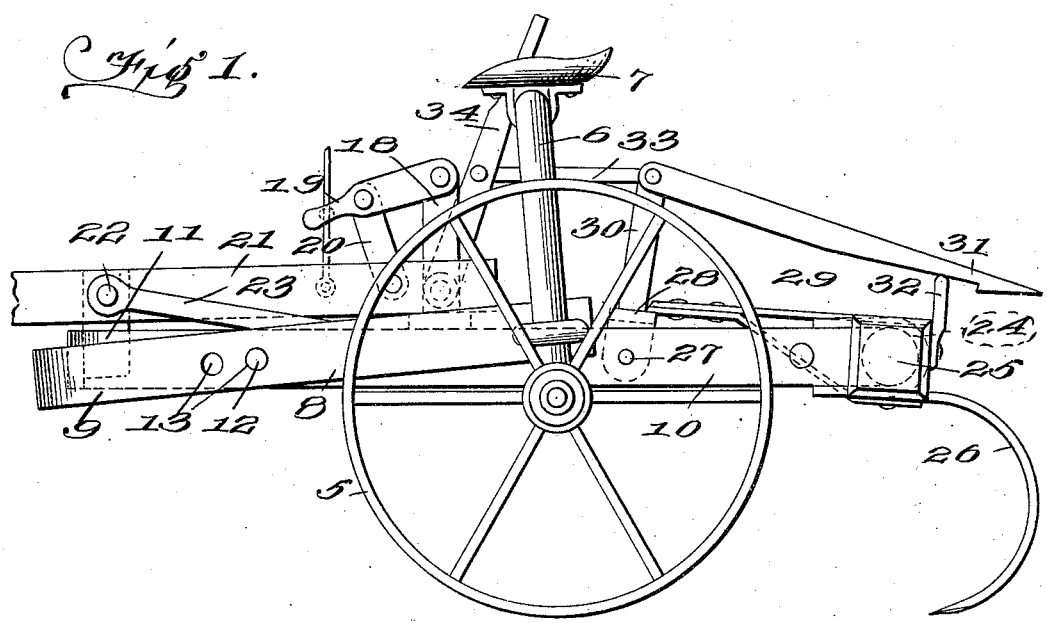
Figure 3:
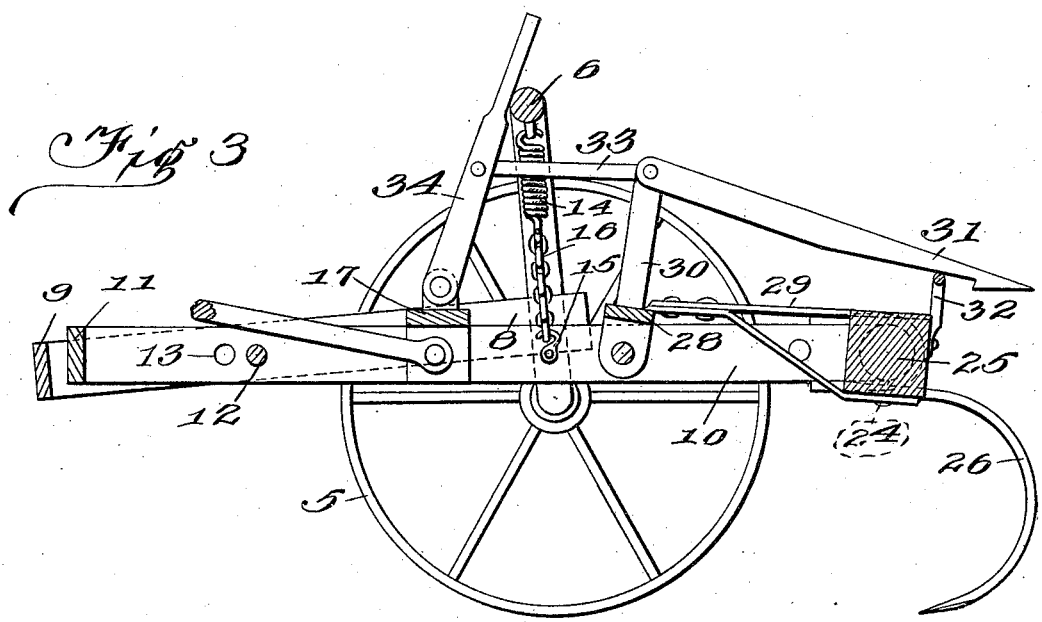

In the accompanying drawing, Figure 1 is a side elevation of the invention. Fig. 2 is a plan view. Fig. 3 is a longitudinal section.

Referring specifically to the drawings, 5 are the wheels of the machine which are mounted on an arched axle 6 carrying a seat 7 for the driver or operator. To the two vertical branches of the axle are secured longitudinal bars 8 which extend forwardly and are connected at their front ends to form a U-shaped frame 9.

The rake is carried by a supporting-frame comprising longitudinal bars 10 which are connected at their front ends to form a U-shaped frame 11. This frame is pivotally mounted inside the frame 9 on a cross-rod 12 passing through the bars 8 and 10. A number of holes 13 are made in said bars in order that the frame 11 may be adjusted forwardly or rearwardly in the frame 9. The rear end of the frame 11 is suspended from the horizontal portion of the axle 6, by means of springs 14 secured at one end to said portion of the axle, and connected at the other end to hooks 15 on the frame by means of a short section of chain 16. The chain enables the frame to be hung higher or lower to bring the rake into proper position with respect to the ground.

The bars 10, in front of the axle, are connected by a cross-bar 17 on which is mounted a standard 18 on which is pivoted a hand-lever 19 connected by a link 20 to the rear end of the draft tongue 21. Said tongue is pivoted at 22 to a furcate frame 23 rigidly secured to the frame 11. The rear end of the bars 10 carry bearings 24 in which is mounted a rake-head 25 to which the rake-teeth 26 are secured. Behind the axle 6, the bars 10 are connected by a cross-rod 27 on which is mounted a rocking-bar 28 which is adapted to be engaged by arms 29 secured to and projecting forwardly from the rake-head. On the bar 28 is mounted a standard 30 to which is pivoted a hook 31 which is adapted to engage a catch 32 on the rake-head. The standard 30 is also connected by a link 33 to a hand-lever 34 fulcrumed on the cross-bar 17.

The rake is held in operative position by the engagement of the arms 29 with the bar 28. The load is dumped by tilting said bar forwardly by means of the hand-lever 34, which releases the arms and permits the rake-head to rotate in its bearings as the rake flops over to dump its load. When the bar is tilted forwardly as stated, the hook 31 pulls the rake-head over and starts its rotary movement. After the rake has made one complete revolution to dump the load, the arms 29 again engage the bar 28 where-upon the rake is again in operative position, said bar having in the meantime been returned to its normal position in the path of the arms. The hook 31 also again engages the catch 32 when the rake comes into this position.

The draft is applied direct to the rake-supporting frame 11, and as said frame is pivoted to the frame 9, and suspended from the axle 6, the rake-teeth will not dig into the ground when the machine is traveling over rough ground, and the wheels can travel over high and low places without a perceptible raising or lowering of the rake-head. The springs 14 also prevent the rake-head from dropping down on the ground when it is released to dump the load. The pivotal connection between the rake-supporting frame and the rear end of the draft tongue is to enable said end of the tongue to be raised or lowered, whereby the position of the rake-teeth with respect to the ground can be adjusted to suit the work. The tongue is operated by the hand-lever 19 which is provided with a suitable locking device for holding it in adjusted position.

The rake-teeth are flat springs of sufficient strength to stop a light team if a grub is encountered and the machine is built for hard, rough work. If the ground is very rough runners may be substituted for the wheels.

I claim:

1. A rake comprising a wheeled main frame, a rake, a supporting frame therefor pivoted to said main frame and having its free end suspended therefrom, and draft devices connected to the rake-supporting frame.

2. A rake comprising a main frame, a rake, a supporting frame therefor pivoted to said main frame, an elastic connection between the free end of the rake-supporting frame and the main frame, and draft devices connected to the rake-supporting frame.

3. A rake comprising a wheeled frame having an arched axle, a rake, a supporting frame for the rake pivoted to said frame in front of the axle, a connection between the free end of the rake-supporting frame and the axle, and draft devices connected to the rake-supporting frame.

4. A rake comprising a main frame, a rake, a supporting frame therefor pivoted to said main frame and having its free end suspended therefrom, a draft tongue pivoted to the rake-supporting frame, and means on said frame for raising and lowering the butt-end of said tongue.

5. A rake comprising a supporting-frame, a rotatable rake-head carried thereby and having projecting arms, a catch on the rake-head, a tilting bar carried by the frame and engageable by the arms for holding the rake in operative position, a hook carried by the bar and engageable with the catch on the rake-head, and means for operating the bar to withdraw the same from the rake-head arms and to start the rotation of the rake-head through the medium of the aforesaid hook and catch.

In testimony whereof I affix my signature, in presence of two witnesses.

WILLIAM HENRY JONES.

Witnesses:
J. C. HALLAMAN,
EZRA STEPHENS.